United States Patent [19]
Yoshida

[11] Patent Number: 5,981,055
[45] Date of Patent: Nov. 9, 1999

[54] TAPE-TYPE MAGNETIC RECORDING MEDIUM AND SIGNAL REPRODUCING METHOD USING THE SAME

[75] Inventor: Shinya Yoshida, Miyagi, Japan

[73] Assignee: Sony Corporation, Tokyo, Japan

[21] Appl. No.: 09/028,501

[22] Filed: Feb. 24, 1998

[30] Foreign Application Priority Data

Feb. 24, 1997 [JP] Japan .................................. 9-039502

[51] Int. Cl.$^6$ ....................................................... G11B 5/66
[52] U.S. Cl. ...................... 428/332; 428/336; 428/694 T; 428/694 TS; 428/692; 428/900; 360/101; 360/113; 360/115; 360/134
[58] Field of Search .......................... 428/694 T, 694 TS, 428/336, 332, 900, 692; 360/101, 113, 115, 134

[56] References Cited

U.S. PATENT DOCUMENTS

| | | | |
|---|---|---|---|
| 5,252,148 | 10/1993 | Shigeta | 148/307 |
| 5,552,217 | 9/1996 | Yamaguchi | 428/332 |
| 5,663,857 | 9/1997 | Kumura | 360/126 |

*Primary Examiner*—Leszek Kiliman
*Attorney, Agent, or Firm*—Hill & Simpson

[57] ABSTRACT

A tape-type magnetic recording medium is disclosed which is adaptable to a yoke-type magnetoresistance effect magnetic head and with which a dense recording operation can be performed and a signal reproducing method is disclosed for reproducing a signal recorded on the tape-type magnetic recording medium. The tape-type magnetic recording medium has a magnetic layer formed on a non-magnetic support member, wherein when an assumption is made that residual magnetic flux density of the tape-type magnetic recording medium is Br, the thickness of the magnetic layer is δ, the saturation magnetic flux density of a magnetoresistance effect device of a yoke-type magnetoresistance effect magnetic head serving as a reproducing head is Bs and the thickness of the magnetoresistance effect device is t, the following relationship is satisfied:

$$Bst/2 \leq Br\delta \leq Bst$$

and coercive force Hc of the tape-type magnetic recording medium satisfies Hc≧1500 (Oe).

3 Claims, 3 Drawing Sheets

TAPE-TYPE MAGNETIC RECORDING MEDIUM AND SIGNAL REPRODUCING METHOD USING THE SAME

BACKGROUND OF THE INVENTION

1. Field of the Invention

The present invention relates to a tape-type magnetic recording medium adaptable to a yoke-type magnetoresistance effect magnetic head using a magnetoresistance effect device, and to a method of reproducing a signal from the tape-type magnetic recording medium by using the yoke-type magnetoresistance effect magnetic head.

2. Description of Prior Art

Since a quantity of information which must be recorded has been enlarged, a rise in the recording density has been strongly required in the magnetic recording field. Therefore, a so-called thin-film type magnetic recording medium has mainly been employed in place of a so-called coating-type magnetic recording medium containing magnetic particles dispersed in the binder thereof. The thin-film type magnetic recording medium has a structure that ferromagnetic metal is formed into a film by plating or by using a means for forming a thin film in a vacuum state (a vacuum evaporation method, a sputtering method, an ion plating method or the like).

The thin-film type magnetic recording medium obtained by forming the ferromagnetic metal into a film exhibits large coercive force and excellent square ratio. Moreover, the foregoing medium is not required to mix a binder, which is a non-magnetic material, into the magnetic layer as has been required for the coating-type magnetic recording medium. Therefore, the density at which the magnetic material is filled (that is, the quantity of magnetization per unit volume) can be raised. The thickness of the magnetic layer of the thin-film type magnetic recording medium can considerably be reduced as compared with that of the coating-type magnetic recording medium. Therefore, the thin-film type magnetic recording medium exhibits excellent electromagnetic conversion characteristic in a short wavelength region. Moreover, the thin-film type magnetic recording medium has a characteristic that demagnetization occurring during the recording operation can significantly be reduced. Since the thin-film type magnetic recording medium has the above-mentioned advantageous characteristics as compared with the coating-type magnetic recording medium, it is expected to become a major portion of magnetic recording mediums capable of recording signals at a high density.

In the above-mentioned magnetic recording field, a tape-type magnetic recording medium has been employed which has a magnetic layer formed by a diagonal evaporation method. The tape-type magnetic recording medium formed by the diagonal evaporation method is formed in such a manner that the magnetic layer is formed on a moving non-magnetic support member (in the form of a polyester film or a polymer film made of polyamide or a polyamide film) by diagonally depositing magnetic metal by the vacuum evaporation method. The tape-type magnetic recording medium manufactured by the diagonal evaporation method has a structure that magnetic particles are oriented diagonally with respect to the surface of the non-magnetic support member. Thus, a denser recording operation can be performed as compared with the conventional magnetic tape in which magnetic particles are oriented in the lengthwise direction of the magnetic tape. Specifically, the thin-film type magnetic recording medium has a structure that the magnetic layer has an axis of easy magnetization which is inclined by about 20° with respect to the surface of the non-magnetic support member.

To meet the requirement for raising the recording density, the magnetic head must be improved as well as the improvement in the magnetic recording medium. In particular, a reproducing method has received attention which employs a yoke-type magnetoresistance effect magnetic head (hereinafter called a "yoke type MR head").

The yoke type MR head is a magnetic head using a magnetoresistance effect and capable of detecting a weaker magnetic field of a signal. Therefore, the yoke type MR head 10 can be used even if the magnetic field of the signal is reduced when the recording wavelength is shortened because of the dense recording operation.

However, when the tape-type magnetic recording medium is reproduced by using the yoke type MR head 10, optimum conditions have not been considered. As a result, a satisfactorily high recording density has not been realized.

OBJECT AND SUMMARY OF THE INVENTION

Accordingly, an object of the present invention is to provide a tape-type magnetic recording medium adaptable to a yoke-type magnetoresistance effect magnetic head and capable of recording a signal at a high density.

Another object of the present invention is to provide a signal reproducing method for reproducing a signal recorded on the tape-type magnetic recording medium by using the yoke-type magnetoresistance effect magnetic head.

To achieve the above-mentioned objects, the inventors of the present invention have energetically investigated optimum conditions under which a tape-type magnetic recording medium is reproduced by a yoke-type magnetoresistance effect magnetic head. Thus, a fact has been found that a tape-type magnetic recording medium adaptable to a yoke-type magnetoresistance effect magnetic head can be obtained when the residual magnetic flux density per unit area on the surface of the tape-type magnetic recording medium is made to be a required value and the coercive force is enlarged. That is, a fact has been found that the product of the residual magnetic flux density of the medium and the thickness of the same must be an optimum value in order to prevent magnetic saturation of the magnetoresistance effect magnetic device when the tape-type magnetic recording medium is reproduced by the yoke-type magnetoresistance effect magnetic head. When the thin-film type magnetic recording medium is reproduced by the yoke-type magnetoresistance effect magnetic head, a fact has been found that enlargement of the coercive force enables the magnetization to sharply be inverted to compensate self-demagnetization which occurs because of the short recording wavelength which is employed when signals are recorded at a high density.

According to one aspect of the present invention, there is provided a tape-type magnetic recording medium including: a magnetic layer formed on a non-magnetic support member; wherein when an assumption is made that residual magnetic flux density of the tape-type magnetic recording medium is Br, the thickness of the magnetic layer is δ, the saturation magnetic flux density of a magnetoresistance effect device of a yoke-type magnetoresistance effect magnetic head serving as a reproducing head is Bs and the thickness of the magnetoresistance effect device is t, the following relationship is satisfied:

$$Bst/2 \leq Br\delta \leq Bst$$

and coercive force Hc of the tape-type magnetic recording medium satisfies Hc≧1500 (Oe).

According to another object of the present invention, there is provided a signal reproducing method including the steps of:

using a yoke-type magnetoresistailce effect magnetic head, the saturation magnetic flux density of which is assumed to be Bs and the thickness of which is assumed to be t, and using a tape-type magnetic recording medium which has a magnetic layer formed on a non-magnetic support member, the residual magnetic flux density of which is assumed to be Br and the thickness of the magnetic layer of which is assumed to be δ, wherein the following relationship is satisfied:

$$Bst/2 \leq Br\delta \leq Bst$$

the coercive force Hc of the tape-type magnetic recording medium satisfies Hc≧1500 (Oe), and the tape-type magnetic recording medium is reproduced by the yoke-type magnetoresistance effect magnetic head.

Note that the coercive force Hc is a value measured in an inplane direction.

The tape-type magnetic recording medium having the above-mentioned structure and according to the present invention satisfies the relationship Bst/2≦Brδ≦Bst. Therefore, the magnetoresistance effect device of the magnetoresistance effect magnetic head is not saturated. As a result, the magnetoresistance effect magnetic head can be operated in a range in which the change ratio of the resistance of the magnetoresistance effect device is in the linear form. Thus, the tape-type magnetic recording medium can satisfactorily be reproduced by the magnetoresistance effect magnetic head.

The signal reproducing method using the tape-type magnetic recording medium according to the present invention causes the tape-type magnetic recording medium to be reproduced by the magnetoresistance effect magnetic head under condition that the relationship Bst/2≦Brδ≦Bst is satisfied. As a result, the magnetoresistance effect magnetic head is able to satisfactorily reproduce a magnetic signal recorded on the tape-type magnetic recording medium.

Other objects, features and advantages of the invention will be evident from the following detailed description of the preferred embodiments described in conjunction with the attached drawings.

DETAILED DESCRIPTION OF THE INVENTION

A tape-type magnetic recording medium and a method of reproducing a signal from the tape-type magnetic recording medium according to the present invention will now be described with reference to the drawings.

Figure 1:
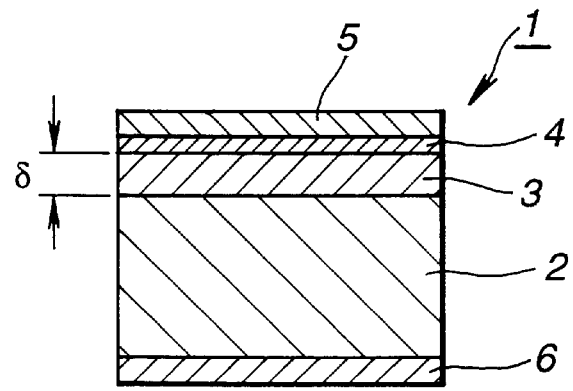
FIG. 1 is a cross sectional view showing a tape-type magnetic recording medium according to the present invention.

A tape-type magnetic recording medium 1 according to an embodiment of the present invention has a structure that at least a magnetic layer 3 is formed on a non-magnetic support member 2, as shown in FIG. 1. The tape-type magnetic recording medium 1 has a protective film 4 formed on the magnetic layer 3. Moreover, a top coat layer 5 is formed on the protective film 4. The tape-type magnetic recording medium 1 has a backcoat layer 6 on the surface of the non-magnetic support member 2 opposite to the surface on which the magnetic layer 3 is formed. Note that the protective film 4, the top coat layer 5 and the backcoat layer 6 may be omitted from tape-type magnetic recording medium according to the present invention.

The magnetic layer 3 of the tape-type magnetic recording medium 1 is formed into a thin magnetic film which is formed by a diagonal evaporation method to be described later. The thin magnetic film is made of a magnetic metal material. The magnetic metal material may be ferromagnetic metal, such as Fe, Co and Ni, a Co—Ni alloy, a Co—Ni—Pt alloy, a Fe—Co—Ni alloy, a Fe—Ni—B alloy, a Fe—Co—B alloy, a Fe—Co—Ni—B alloy or Co—Cr alloy (including Co—Cr—Ta and Co—Cr—Pt).

The coercive force Hc of the magnetic layer 3 is about 1500 Oe or greater and product Brδ of residual magnetic flux density Br and thickness δ of the magnetic layer 3 is made to be a small value. That is, the tape-type magnetic recording medium 1 has the relationship satisfying Bst/2≦Brδ≦Bst with a magnetoresistance effect magnetic head having a magnetoresistance effect device when the tape-type magnetic recording medium 1 is reproduced by the magnetoresistance effect magnetic head including a magnetoresistance effect device on the assumption that the residual magnetic flux density of the magnetoresistance effect device is Bs and the thickness of the same is t.

The non-magnetic support member 2 on which the magnetic layer 3 is formed may be a polymer support member made of a material, such as polyester, cellulose derivatives, vinyl resins, polyimide, polyamide or polycarbonate.

The protective film 4 which is formed on the magnetic layer 3 may be in the form of a carbon film or made of $Al_2O_3$, Ti—N, Mo—C, Cr—C, SiO, $SiO_2$, Si—N or the like. The top coat layer 5 which is formed on the protective film 4 is made of a corrosion-resistance material, a lubricant and the like. The top coat layer 5 may be applied to the upper surface of the protective film 4 or formed into a thin film on the same. The backcoat layer 6, which is formed on the surface of the non-magnetic support member 2 opposite to the surface on which the magnetic layer 3 is formed, is a layer in which fine carbon particles and inorganic pigment which controls the surface roughness are dispersed. The backcoat layer 6 improves the movement characteristic of the tape-type magnetic recording medium 1.

Since the magnetic layer 3 of the tape-type magnetic recording medium 1 having the above-mentioned structure is formed by the diagonal evaporation method as described above, the axes of easy magnetization are diagonal with respect to the surface of the non-magnetic support member 2. Therefore, the tape-type magnetic recording medium 1 permits magnetic signals to be recorded at a density higher than that realized by a conventional horizontal recording method.

Since the tape-type magnetic recording medium 1 has the coercive force of 1500 Oe or greater, sharp inversion of magnetization is permitted. That is, the tape-type magnetic recording medium 1 enables magnetic signals to be recorded at a high density.

The tape-type magnetic recording medium 1 has the relationship satisfying $Bst/2 \leq Br\delta \leq Bst$ with a magnetoresistance effect magnetic head for reproducing the tape-type magnetic recording medium 1. Therefore, the tape-type magnetic recording medium 1 enables the yoke-type magnetoresistance effect magnetic head to be operated within the limit of the reproducing performance of the yoke-type magnetoresistance effect magnetic head when the tape-type magnetic recording medium 1 is reproduced by the yoke-type magnetoresistance effect magnetic head.

Figure 2:
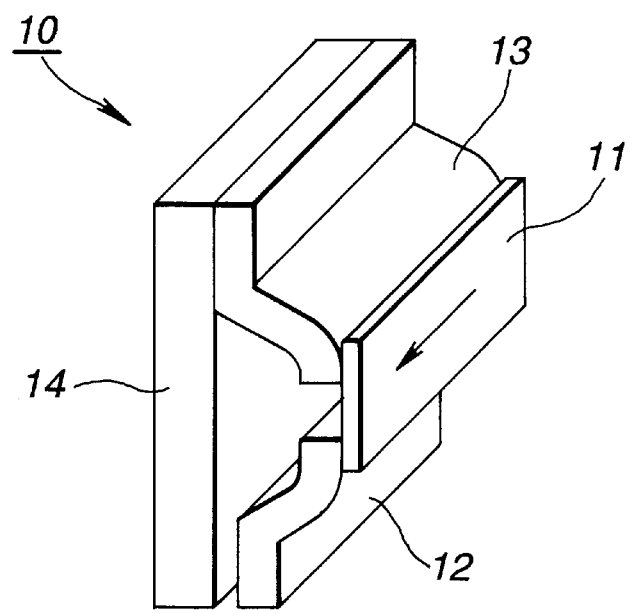
FIG. 2 is a perspective view schematically showing a yoke-type MR head.

When a magnetic signal recorded on the magnetic layer 3 of the tape-type magnetic recording medium 1 having the above-mentioned structure is reproduced, a yoke-type magnetoresistance effect magnetic head 10 (hereinafter called a yoke type MR head 10) is operated which has the structure as shown in FIG. 2.

The yoke type MR head 10 has a yoke-type magnetoresistance effect device 11 (hereinafter called an "MR device 11") formed into substantially a rectangular shape, a leading-end yoke 12 and a trailing-end yoke 13 disposed at two ends in a direction perpendicular to the lengthwise direction of the MR device 11. Moreover, the yoke type MR head 10 has a yoke 14 which is disposed adjacent to the leading-end yoke 12 through a non-magnetic material and which is in contact with the trailing-end yoke 13. The yoke type MR head 10 has a pair of electrodes (not shown) at two ends in the lengthwise direction of the MR device 11.

The yoke type MR head 10 having the above-mentioned structure forms a magnetic gap when the leading-end yoke 12 and the yoke 14 are allowed to abut against each other through a non-magnetic. The magnetic gap detects the magnetization of a magnetic signal. The detected magnetic signal causes a closed loop to be formed because a magnetic flux flows in the leading-end yoke 12, the MR device 11, the trailing-end yoke 13 and the yoke 14.

Figure 3:
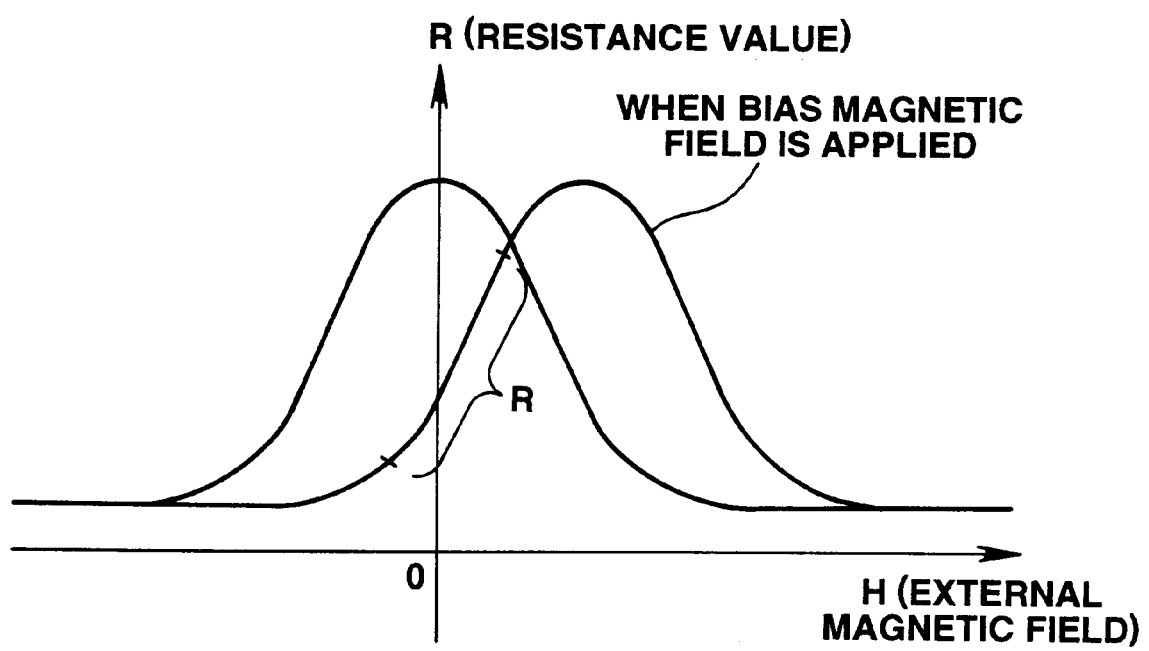
FIG. 3 is a graph showing a magnetoresistance effect curve in such a manner that the axis of abscissa stands for external magnetic fields and the axis of ordinate stands for resistance values of the MR device.

In the yoke type MR head 10, a predetermined sense electric current is supplied, to the MR device 11, from the pair of the electrodes connected to the MR device 11. When a closed loop is formed as described above because of supply of a magnetic signal which is an external magnetic field, a direction of magnetization of the MR device 11 is changed. As a result, the electric resistance of the MR device 11 is changed, as shown in FIG. 3. The yoke type MR head 10 detects change in the electric resistance as change in the voltage when the predetermined sense electric current is supplied to the MR device 11.

The MR device 11 has a so-called magnetoresistance effect as shown in FIG. 3 with which the electric resistance of the MR device 11 is changed when a magnetic field is supplied from outside to the MR device 11. Thus, the voltage of the supplied sense electric current is changed by a degree corresponding to change in the electric resistance. The yoke type MR head 10 detects the change in the voltage of the sense electric current in such a manner as to reproduce the magnetic signal. Note that the yoke type MR head 10 is, at this time, in a state in which a bias magnetic field is being applied to the MR device 11. Since the bias magnetic field is applied to the MR device 11, the resistance of the MR device 11 can be changed with a satisfactory linearity.

In the yoke type MR head 10, the leading-end yoke 12 and the yoke 14 detect the magnetic field of a signal applied from the tape-type magnetic recording medium. Therefore, the MR device 11 does not detect the magnetization. It leads to a fact that the yoke type MR head 10 has an unsatisfactorily low head efficiency. Specifically, the head efficiency of the yoke type MR head 10 is about 0.2 or smaller.

Assuming that the residual magnetic flux density of the magnetic layer 3 is Br, the thickness of the magnetic layer 3 is δ, the saturation magnetic flux density of the yoke type MR head 10 is Bs and the thickness of the yoke type MR head 10 is t, the yoke type MR head 10 having the head efficiency of about 0.2 and the tape-type magnetic recording medium 1 have the relationship satisfying $Bst/2 \leq Br\delta \leq Bst$. Therefore, the tape-type magnetic recording medium 1 does not magnetically saturate the MR device 11 with the signal magnetic field generated from the tape-type magnetic recording medium 1. That is, the magnetic signal recorded on the tape-type magnetic recording medium 1 does not magnetically saturate the MR device 11. Thus, the magnetic signal causes the MR device 11 to be operated in a region which is indicated with a symbol R shown in FIG. 3 and in which satisfactory linearity can be realized.

Moreover, the tape-type magnetic recording medium 1 is structured in such a manner that the coercive force Hc of the tape-type magnetic recording medium 1 satisfies $Hc \geq 1500$ (Oe). As a result, the magnetization of the magnetic layer 3 can sharply be inverted in response to the magnetic signal. It leads to a fact that a problem in that the self-demagnetizing field is unsatisfactorily enlarged as the wavelength of the magnetic signal is shortened can be prevented. That is, the tape-type magnetic recording medium 1 permits magnetic signals to be recorded at a high density.

Note that the MR device 11 of the yoke type MR head 10 may be a so-called GMR device exhibiting a giant magnetoresistance effect. Also in this case, the tape-type magnetic recording medium and the MR head must have the relationship satisfying $Bst/2 \leq Br\delta \leq Bst$ on the assumption that the saturation magnetic flux density of the GMR device is Bs and the thickness is t.

The tape-type magnetic recording medium 1 having the above-mentioned structure is manufactured by the so-called diagonal evaporation method. The magnetic metal material for forming the magnetic layer 3 on the non-magnetic support member 2 is formed into a thin film by the diagonal evaporation method. The magnetic layer 3 of the tape-type magnetic recording medium 1 is formed by an evaporating apparatus 20 structured as shown in FIG. 4.

The evaporating apparatus 20 has a cooling can 21 on which the non-magnetic support member 2 is wound in such a manner that the surface of the non-magnetic support member 2 on which the magnetic layer 3 is formed faces the outside. Moreover, the evaporating apparatus 20 has a discharge roll 22 around which the non-magnetic support member 2 is wound and from which the non-magnetic support member 2 is supplied to the cooling can 21. In addition, the evaporating apparatus 20 has a winding roll 23 for winding the non-magnetic support member 2 up, a crucible 24 in which the magnetic metal material is introduced and a pair of shutters 25 disposed opposite to the non-magnetic support member 2 wound along the cooling can 21. The evaporating apparatus 20 is structured in such a manner that the pair of the shutters 25 expose only a portion of the non-magnetic support member 2 to the outside. The evaporating apparatus 20 has a pair of tension rollers 26 for winding the non-magnetic support member 2 on the cooling can 21 under a predetermined tension.

The evaporating apparatus 20 is arranged in such a manner that the crucible 24 is disposed diagonally with respect to the cooling can 21. Namely, the evaporating apparatus 20 is structured in such a manner that the portion of the non-magnetic support member 2 which is exposed to the outside and the crucible 24 oppose to each other with a predetermined angle, the non-magnetic support member 2 being wound on the cooling can 21. Specifically, particles of the magnetic metal material allowed to fly from the crucible 24 are deposited on the portion of the non-magnetic support member 2 exposed to the outside with a predetermined angle of incidence.

Figure 4:
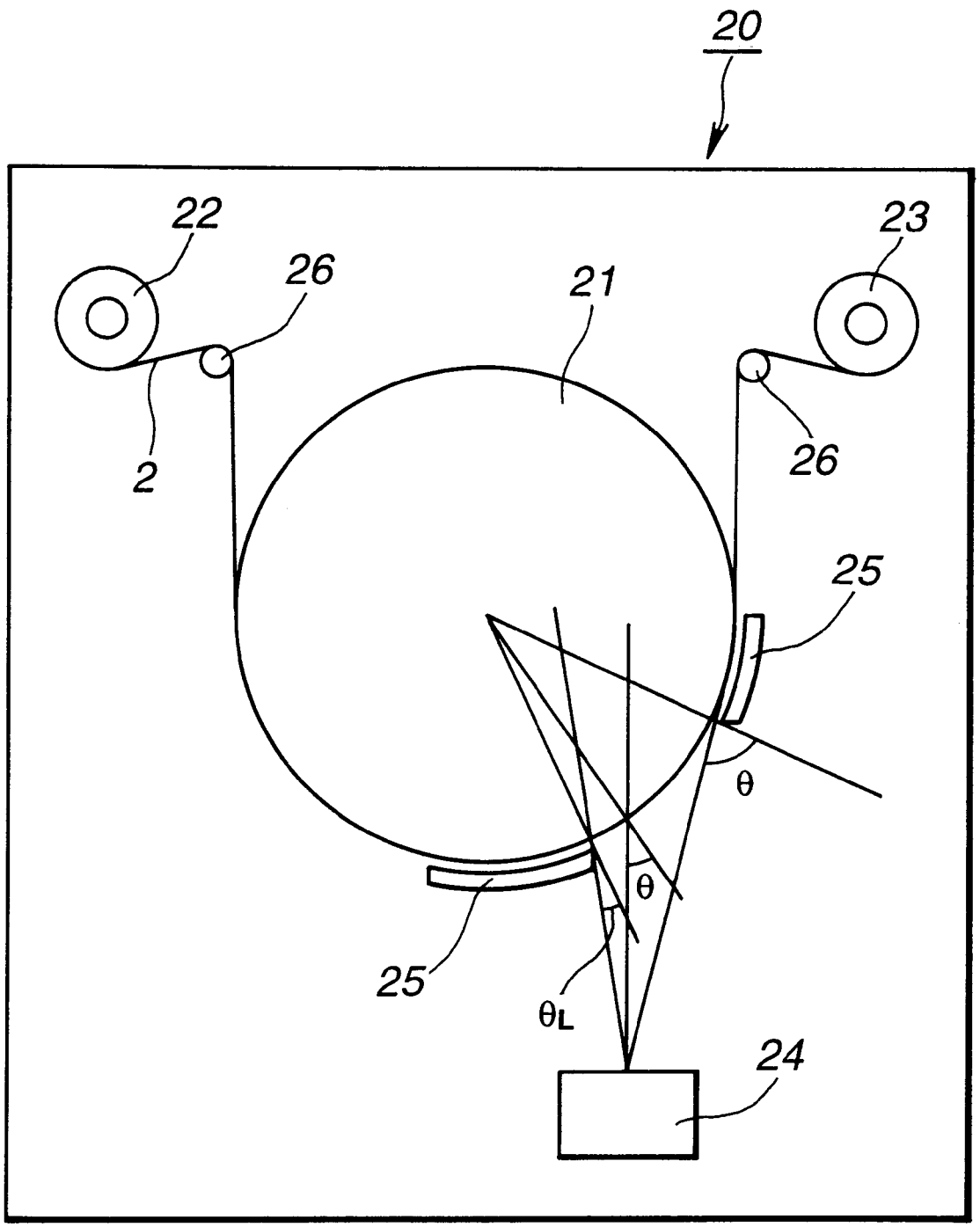
FIG. 4 is a schematic view showing an evaporation apparatus adaptable to the method of manufacturing the tape-type magnetic recording medium according to the present invention.

As indicated with symbol θ shown in FIG. 4, the angle of incidence is an angle made between a direction in which the magnetic metal particles fly and the angle of the radius of the cooling can 21. The smallest angle of incidence is made to be a smallest incidental angle $θ_L$. The evaporating apparatus 20 for use in the method of manufacturing the tape-type magnetic recording medium according to the present invention is arranged to have smallest incidental angle $θ_L$ of 50° to 90°.

When the magnetic layer 3 is formed on the surface of the non-magnetic support member 2 by using the evaporating apparatus 20, the magnetic metal material in the crucible 24 is heated. Thus, the magnetic metal material is evaporated on the surface of the non-magnetic support member 2. The evaporating apparatus 20 enables the magnetic layer 3 to be formed on only the portion of the non-magnetic support member 2 which is exposed to the outside except the portion which is covered with the pair of the shutters 25. The non-magnetic support member 2 is moved on the non-magnetic support member 2 in a direction from the discharge roll 22 toward the winding roll 23 so that the magnetic layer 3 is sequentially formed on the non-magnetic support member 2.

Since the crucible 24 opposes the portion of the non-magnetic support member 2 which is exposed to the outside in such a manner that a predetermined angle is made, the magnetic metal material evaporated from the crucible 24 is deposited on the non-magnetic support member 2 in such a manner that a predetermined angle is made. That is, the evaporating apparatus 20 is arranged in such a manner that the smallest incidental angle $θ_L$ of the magnetic metal material which must be deposited is made to be 50° to 90°. Therefore, the deposited particles of the magnetic metal material has a self-shadow effect. The "self-shadow effect" is an effect of causing particles which are deposited so as to be formed into a thin film to be shadowed by particles which are deposited adjacently when the thin film is grown. Therefore, the self-shadow effect prevents formation of a dense film, thus causing a film to be formed which has a multiplicity of voids. As a result, the evaporating apparatus 20 forms the magnetic layer 3 having a coarse structure including a multiplicity of voids.

Therefore, the magnetic layer 3 of the tape-type magnetic recording medium 1 has a low saturation magnetic flux density and a low residual magnetic flux density. Moreover, the tape-type magnetic recording medium 1 is formed into a structure that the magnetic particles are spatially separated from one another because of defects and voids included in the formed film. Thus, the coercive force of the tape-type magnetic recording medium 1 is enlarged. Moreover, the method according to the present invention enables the magnetic characteristic of the magnetic layer 3 to easily be controlled.

Specifically, the method according to the present invention is able to manufacture the tape-type magnetic recording medium 1 satisfying the relationship $Bst/2 \leq Brδ \leq Bst$ on the assumption that the residual magnetic flux density of the magnetic layer 3 is Br, the thickness of the magnetic layer 3 is δ, the saturation magnetic flux density of the MR device 11 is Bs and the thickness of the MR device 11 is t.

Therefore, the method according to the present invention is able to manufacture the tape-type magnetic recording medium 1 which does not magnetically saturate the MR device 11 of the yoke type MR head 10. That is, magnetic signals recorded on the tape-type magnetic recording medium 1 enable the MR device 11 to be operated within the region R which is shown in FIG. 3 and in which satisfactory linearity can be obtained.

Moreover, the method according to the present invention is able to manufacture the tape-type magnetic recording medium 1 having the magnetic layer 3, the coercive force Hc of which satisfies Hc≧1500 (Oe). As a result, the tape-type magnetic recording medium 1 is able to cause the magnetization to sharply be inverted when a magnetic signal is recorded. Therefore, the tape-type magnetic recording medium 1 is able to prevent the problem which arises in that the self-demagnetizing field is unsatisfactorily enlarged as the wavelength of the magnetic signal is shortened. That is, the tape-type magnetic recording medium 1 permits magnetic signals to be recorded at a high density.

On the other hand, a method of reproducing a signal from the tape-type magnetic recording medium according to the present invention is characterized in that the relationship $Bst/2 \leq Brδ \leq Bst$ is satisfied when the tape-type magnetic recording medium 1 is reproduced by the yoke-type magnetoresistance effect magnetic head 10 having the magnetoresistance effect device 11. The foregoing relationship is satisfied when an assumption is made that the residual magnetic flux density of the tape-type magnetic recording medium 1 is Br, the thickness of the magnetic layer 3 is δ, the saturation magnetic flux density of the magnetoresistance effect device is Bs and the thickness of the same is t.

That is, the method of reproducing a signal according to the present invention reproduces the tape-type magnetic recording medium 1 by the yoke type MR head 10 including the MR device 11 having the resistance change ratio shown in FIG. 3. Since the tape-type magnetic recording medium 1 and the yoke type MR head 10 satisfy the relationship $Bst/2 \leq Brδ \leq Bst$ when the reproducing operation is performed, the signal reproducing process can be performed without magnetic saturation of the MR device 11.

Since the interaction among the magnetic particles in the tape-type magnetic recording medium 1 is prevented, noise can be prevented. The S/N ratio of the tape-type magnetic recording medium 1 considerably exerts an effect on the yoke type MR head 10. Since the signal reproducing method according to the present invention is able to reduce noise of the tape-type magnetic recording medium 1, a high S/N ratio can be realized.

EXAMPLES

The tape-type magnetic recording medium 1 was manufactured by employing the method according to the present invention to evaluate the characteristics of the manufactured tape-type magnetic recording mediums 1. Examples 1 to 3 and Comparative Examples 1 to 5 were manufactured.

The examples and comparative examples were manufactured in such a manner that a polymer film was employed to form the non-magnetic support member 2. Moreover, the magnetic layer 3 was formed on the surface of the polymer film. When the magnetic layer 3 was formed, the magnetic metal material was evaporated by the diagonal evaporation method using the evaporating apparatus 20, as shown in FIG. 4. Copper was employed as the magnetic metal material.

Conditions under which the film forming process was performed was as follows:

Film Forming Conditions
 Ingot: $Co_{100}$
 Angle of Incidence: 50° to 90°
 Degree of Vacuum: $2 \times 10^{-2}$ Pa The magnetic layer 3 was formed on the non-magnetic support member 2 under the above-mentioned film forming conditions. Thus, the magnetic layer 3 is formed because Co is deposited as magnetic particles and Co—O is deposited as non-magnetic particles. The thus-formed magnetic layer 3 had the axis of easy magnetization which was inclined by 20° to 30° on the surface of the non-magnetic support member 2. Note that the thickness of the magnetic layer 3 was adjusted by changing the tape moving speed or electric power supplied from an electronic gun of the evaporating apparatus 20.

Then, the carbon protective film 4 having a thickness of about 8 nm was formed on the magnetic layer 3. Then, the top coat layer 5 was formed on the protective film 4. Moreover, the backcoat layer 6 was formed on the surface of the non-magnetic support member 2 opposite to the surface on which the magnetic layer 3 was formed. Then, the obtained material was cut to have a predetermined width for the magnetic tape so that the tape-type magnetic recording mediums 1 were manufactured.

The magnetic characteristics were controlled so that Examples 1 to 5 and Comparative Examples 1 to 5 were manufactured. The electromagnetic conversion characteristics of the manufactured samples were evaluated. Magnetic signal were recorded by using a MIG (Metal in Gap) head having a gap length of 0.22 μm and a track width of 86 μm. Note that the recording wavelength of each magnetic signals was 0.3 μm employed as a wavelength which is expected to be employed in the future very-high density recording process.

The electromagnetic conversion characteristics were measured in such a manner that a yoke-type MR head was employed which included the MR device 11 made of Ni—Fe and each of the leading-end yoke 12, the trailing-end yoke 13 and the yoke 14 was made of permalloy. The yoke-type MR head included the MR device 11 having a gap length of 0.3 μm, a track width of 5 μm and Bst of 400 (G·μm). The length of the MR device 11 was 50 μm, the width of the same was 7 μm and the thickness of the same was 40 nm. The head efficiency of the yoke-type MR head was about 0.2. The electromagnetic conversion characteristics were measured in such a manner that the tape moving speed was 1 m/minute which was relative speed.

The samples were reproduced by the yoke-type MR head to measure the S/N ratio of each sample. Results were shown in Table 1. The magnetic characteristics were measured by a sample-oscillation type magnetometer.

TABLE 1

Recording Wavelength: 0.3 μm
Employed Head: Yoke-Type Ni—Fe MR Head
Bs of Head: 10 [kG]
t: 0.04 μm
Bs · t = 400 [G · μm]

|  | Brδ [G · μm] | Hc//[Oe] | S/N Ratio [dB] |
|---|---|---|---|
| Example 1 | 400 | 1700 | 22.1 |
| Example 2 | 300 | 1800 | 22.5 |
| Example 3 | 200 | 1550 | 21.7 |
| Comparative Example 1 | 500 | 1800 | 16.1 |
| Comparative Example 2 | 150 | 1750 | 17.2 |

TABLE 1-continued

Recording Wavelength: 0.3 μm
Employed Head: Yoke-Type Ni—Fe MR Head
Bs of Head: 10 [kG]
t: 0.04 μm
Bs · t = 400 [G · μm]

|  | Brδ [G · μm] | Hc//[Oe] | S/N Ratio [dB] |
|---|---|---|---|
| Comparative Example 3 | 350 | 1200 | 18.8 |
| Comparative Example 4 | 450 | 1800 | 17.5 |
| Comparative Example 5 | 100 | 1600 | 16.2 |

If the S/N ratio shown in Table 1 is 20 dB or greater, it can be said that the sample has an excellent electromagnetic conversion characteristic. The value of the S/N ratio exceeding 20 dB corresponds to $5 \times 10^{-7}$ in terms of an error rate. Therefore, the obtained value of the S/N ratio of 20 dB or greater is a satisfactory error rate required for usual data media.

As can be understood from Table 1, the tape-type magnetic recording medium 1 is structured in such a manner that the magnetic layer 3 and the yoke type MR head 10 for reproducing the tape-type magnetic recording medium 1 have the relationship of the magnetic characteristic satisfying $Bst/2 \leq Br\delta \leq Bst$. Moreover, the coercive force of the magnetic layer 3 is 1500 Oe or greater. Thus, the tape-type magnetic recording medium 1 has an excellent electromagnetic conversion characteristic.

As described above, the tape-type magnetic recording medium according to the present invention is reproduced by the yoke-type magnetoresistance effect magnetic head in such a manner that the relationship $Bst/2 \leq Br\delta \leq Bst$ is satisfied. The foregoing relationship is satisfied when an assumption is made that the saturation magnetic flux density of the magnetoresistance effect device of the yoke-type magnetoresistance effect magnetic head is Bs and the thickness of the same is t. As a result, the tape-type magnetic recording medium according to the present invention can be reproduced by the yoke-type magnetoresistance effect magnetic head with satisfactory S/N ratio.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording tape comprising:
 a magnetic layer formed on a non-magnetic support layer having longitudinal and lateral axes;
 wherein,
 (a) when that the residual magnetic flux density of said magnetic recording tape is Br, the thickness of said magnetic layer is δ, the saturation magnetic flux density of a magnetoresistance effect device of a yoke magnetoresistance effect magnetic head serving as a reproducing head is Bs and the thickness of said magnetoresistance effect device is t, the following relationship is satisfied:

$$Bst/2 \leq Br\delta \leq Bst,$$

(b) a coercive force Hc of said tape magnetic recording medium is greater than or equal to 1500 (Oe), (c) the magnetic layer comprises a thin magnetic film made of a magnetic metal material, (d) the axes of easy magnetization of the magnetic layer are diagonal with respect to a plane of the non-magnetic support layer, defined by the longitudinal and lateral axes, and (e) the magnetic layer comprises magnetic particles spatially separated from one another because of defects and voids in the magnetic layer and deposited at an angle of 50° to 90° with respect to said plane of said support layer.

2. A magnetic recording tape according to claim 1, wherein said magnetic layer has a magnetic metal film formed by a diagonal evaporation method with an incidence angle of 50° to 90°.

3. A signal reproducing method comprising the steps of:

using a yoke magnetoresistance effect magnetic head, the saturation magnetic flux density of which is Bs and the thickness of which is t, using a magnetic recording tape which has a magnetic layer formed on a non-magnetic support layer, the residual magnetic flux density of which is Br and the thickness of said magnetic layer is $\delta$ so that the following relationship $Bst/2 \leq Br\delta \leq Bst$ is satisfied, the coercive force Hc of said magnetic recording tape being less than or equal to 1500 (Oe), and moving said head relative to said magnetic recording tape, thereby to reproduce signals in said magnetic recording tape medium, said signals being reproduced with a signal to noise ratio of 20 dB or greater.

* * * * *